N. DREW.
Churn.
No. 66,687. Patented July 16, 1867.
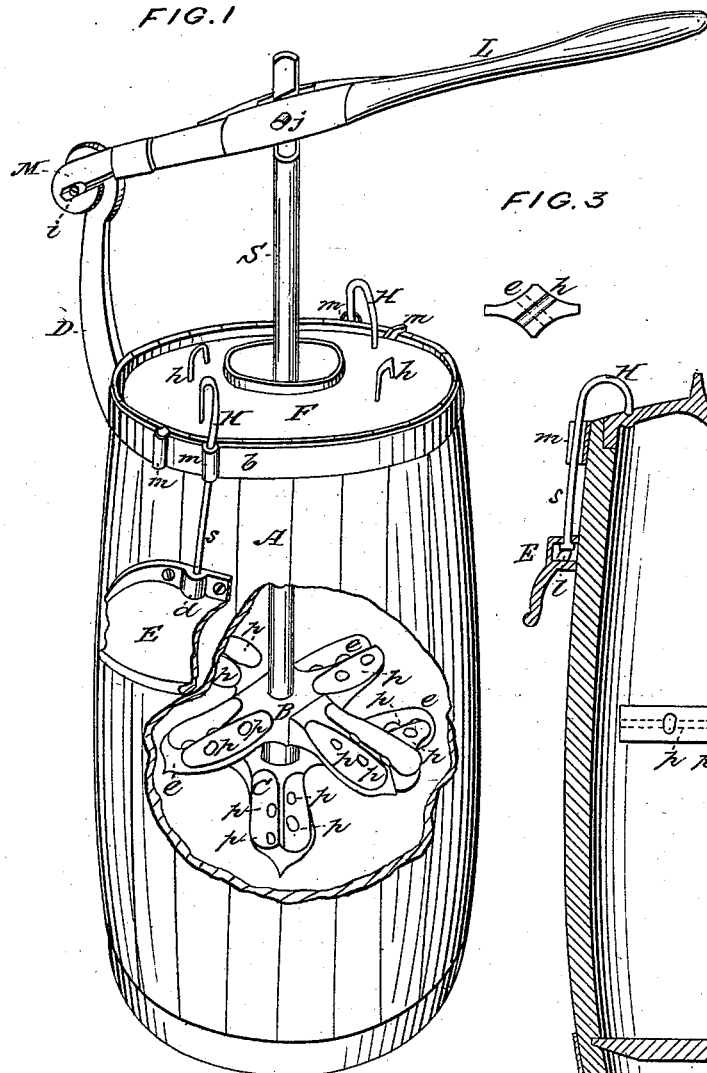
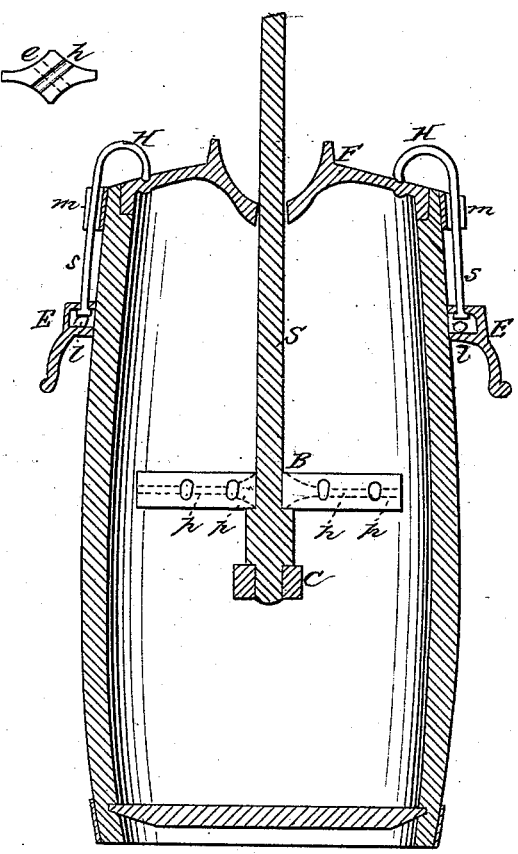
WITNESSES:
O. L. Cook
Otto L. Johnson
INVENTOR:
Noah Drew

United States Patent Office.

NOAH DREW, OF HOWELL, MICHIGAN.

Letters Patent No. 66,687, dated July 16, 1867.

---

CHURNS.

---

The Schedule referred to in these Letters Patent and making part of the same.

---

TO ALL WHOM IT MAY CONCERN:

Be it known that I, NOAH DREW, of Howell, in the county of Livingston, and State of Michigan, have invented certain new and useful improvements in Churns; and I do hereby declare that the following is a full, clear, and exact description of the same, reference being had to the annexed drawings, making a part of this specification, in which—

Figure 1 is a perspective view.

Figure 2 is a vertical section.

Figure 3 is a cross-section of a dasher-wing.

Similar letters indicate corresponding parts in all the figures.

My invention relates partly to an improved construction and arrangement of dasher-wings or blades for churning the cream in a very quick and effective manner; also to certain devices, which I term "shielded hooks," operated in connection with the churn-handles, for more readily fastening and liberating the cover, and other improvements in details, the several parts being constructed and arranged in the manner I am now about to describe.

I generally construct the receptacle for the cream of staves, hooped together in the ordinary barrel form, as exhibited at A, two dashers, B C, secured a proper distance apart, at and near the lower end of the staff S, being secured against shoulders formed by an enlargement of said staff, and operated up and down inside the barrel in the manner of a common barrel-churn dasher.

In my peculiar arrangement of dasher-wings considerable friction or resistance to their vertical motion in the cream is produced; consequently when the staff of the dashers cannot readily be operated by any but hand-power, I employ a lever, L, which is connected to an arm, D, by what I term a detachable rule-joint, allowing parallelism of motion, to be more particularly described hereinafter.

I construct my two dashers with radial wings or blades, $e$, the wings of one dasher being set or fastened to the staff immediately over or opposite the spaces or intervals in the other. I hollow out or chamfer these wings on both sides, as seen in fig. 3, and make any desired number of angular perforations, $p$, through the deeper central parts. Such perforations or holes should be alternately in opposite directions, at angles which may beneficially approximate forty-five degrees of inclination.

My devices for securing and detaching the barrel-cover and working-lever, which I will now describe, I consider to be great improvements on all modes heretofore known, with which I am familiar, for facilitating the many manipulations incidental to butter-making, as will more fully appear.

The handles by which the churn is carried are indicated at E, of cast metal, usually resembling in form the modern "pulls" for drawers. In the central boss $a$, a recess, $r$, is sunk from the inside to receive a head on the long shank of a hook, H, with freedom to move up and down a definite distance. Each handle is furnished with one of these hooks, the long and short shanks of which slide up and down in loop-bearings $m$, as seen formed in or attached to the upper band $b$. I so arrange these hooks in relation with the handles and band, that when they are drawn up as far as the recess permits, the points of the short legs will not be clear of the band-loop bearings, so as to turn outwards, but are free to turn, through slotted passage-ways in the barrel, over the cover F, to hold it down on each side against a shoulder, formed by turning a rebate inside the barrel. This arrangement necessitates a metal cover, F, which I usually make of thin cast iron, with a rim projecting downwards to strengthen it, and make a joint with the shoulder aforesaid. I cup it deeply around the staff, and make the upper surface slightly spherical, so that the hooks will act on it wedge-fashion, and I usually furnish it with wire handles, $n$, and shallow creases, to spring the points of the hooks into, so that they cannot be shaken back.

My mode of jointing the lever is by attaching to its end a pair of joint straps, M, slotted and shaped in such manner as to hook on or off a fast pivot, $i$, in the arm D, but only when the lever is turned back past the working arc of vibration, leaving sufficient play lengthwise to permit rectilinear motion to the dasher-staff.

The operation is as follows: Cream being placed in the churn-barrel and the several operative parts connected and secured as seen in fig. 1, the operator works the lever up and down, when the attrition and agitation produced by the crossed currents of cream passing through the angular holes, especially in the interval between the two dashers, where the opposing currents collide with each other and with the air-particles forced by the hollow side chamfers of the wings, very greatly hasten the development and perfect formation of the butter. When the churning is finished, the pin $j$ connecting the dasher-staff with the lever is removed, and the lever thrown over and extricated from the side pivot of the arm. The shield-hooks are now partially revolved in the loop bearings of the long stems $s$, until the points of the short ones strike against the sides of their loops on the band, when they are pushed down and secured out of the way so that they cannot catch in the dress or injure the hands of the operator while gathering the butter or washing the barrel, after the cover is lifted off by its handles $h$.

I do not claim broadly making oblique apertures or grooves in the dasher-wings, for they have been used before under different conditions from mine; but what I claim, and desire to secure by Letters Patent, is—

1. The employment of two dashers, B and C, having chamfered and perforated wings $e$, constructed and arranged relatively with each other on one staff, substantially in the manner herein described.

2. The employment of revolving shield-hooks H, in combination with loop bearings $m$, and recessed handles E, substantially as and for the purpose herein specified.

3. Hanging the lever L by the use of slotted straps M, in combination with a fast pivot, $i$, projecting from each side of the arm D, substantially as and for the uses set forth.

NOAH DREW.

Witnesses:
C. T. COOK,
OTTO L. JOHNSON.